United States Patent Office 3,340,261
Patented Sept. 5, 1967

3,340,261
2-ARYL-4:6-DIHYDROXY-1:3:5-TRIAZINES AND PROCESS FOR THEIR MANUFACTURE
Eduard Moergeli, Muttenz, Switzerland, assignor to Ciba Limited, Basel, Switzerland, a Swiss company
No Drawing. Filed July 2, 1963, Ser. No. 292,442
Claims priority, application Switzerland, July 3, 1962, 8,027/62
14 Claims. (Cl. 260—248)

It is known that 2-arly-4:6-diamino-1:3:5-triazines can be hydrolyzed with alkali metal hydroxides to form 2-aryl-4:6-dihydroxy-1:3:5-triazines (German specification No. 1,026,456 published Mar. 20, 1958 to Badische Anilin- & Soda-Fabrik Aktiengesellschaft, Ludwigshafen, Germany). On the other hand, it is known from U.S. specification No. 1,734,029 patented Nov. 5, 1929 to George Barsky et al. and from German specification No. 963,331 patented May 9, 1957 to Deutsche Gold-und Silber-Scheideanstalt vormals Roessler, Frankfurt am Main, Germany, that the triazine ring of 2:4:6-triphenyl-1:3:5-triazine is split with aqueous sulphuric acid with quantitative formation of phenyl-carboxylic acid. Consequently, it could not have been foreseen that hydrolysis of 2-aryl-4:6-diamino-1:3:5-triazines with the aid of sulphuric acid would yield 2-aryl-4:6-dihydroxy-1:3:5-triazines.

The present invention is based on the unexpected observation that the triazine ring remains substantially intact when 2-aryl-4:6-diamino-1:3:5-triazines and 2-aryl-4-amino-6-hydroxy-1:3:5-triazines are hydrolyzed with sulphuric acid of a higher concentration. In this manner aryldihydroxytriazines are obtained in a very pure state and in good yields. This acid hydrolysis provides various other further advantages over alkaline hydrolysis. Inter alia, it is possible to manufacture aryl-dihydroxy-triazines containing substituents in the aryl residue, for example nitro or benzoyl groups, which are attached in the course of alkaline hydrolysis. Furthermore, it is easier to convert aryl-diaminotriazines that are sparingly soluble in alkali metal alcoholates, such as 2-(anthraquinonyl-2')-4:6-diamino-1:3:5-triazine, into the corresponding dihydroxy compounds by using concentrated sulphuric acid as solvent since it has better dissolving powers. By virtue of the higher solvent power of concentrated sulphuric acid even large batches require relatively small reaction vessels, and this is of considerable industrial importance. Thus, for example, 1 part by weight of 2-phenyl-4:6-diamino-1:3:5-triazene can be smoothly hydrolyzed with as little as 1.4 parts by volume of 90% sulphuric acid without any technical difficulty. In conjunction with the process disclosed in the recently published French specification No. 1,268,091, granted June 19, 1961, to Sueddeutsche Kalkstickstoff-Werke A.G., Germany—according to which the starting materials used in the new process, i.e. the aryl-diaminotriazines, can be manufactured in a very economical manner even without using an organic solvent—the process of this invention, which is likewise performed in the absence of organic solvents, is of special value.

The aryl-diaminotriazines or aryl-amino-hydroxytriazines to be used as starting materials preferably contain a benzene residue as the aryl residue which may be substituted, for example, by halogen atoms or alkyl, alkoxy, carbonyl, carboxyl, trifluoromethyl, nitro or sulphonyl groups. Further suitable aryl residues are the residues of polycyclic hydrocarbons or their substitution products, for example the residue of diphenyl, naphthalene, anthracene, anthraquinone, pyrene, fluoranthene or chrysene.

It is of advantage to carry out the hydrolysis with 70-96% sulphuric acid at a temperature ranging from 90 to 150° C. In this connection it should be borne in mind that when highly concentrated sulphuric acid is used, there is less risk of the triazine ring being split but on the other hand the risk of the aryl residue being sulphonated is greater. It is surprising that under these energetic reaction conditions very many products, including 2-phenyl-4:6-diamino-1:3:5-triazine, can be hydrolyzed without appreciable sulphonation. In certain cases, however, sulphonation may be desirable.

The working up of the hydrolysis product is extremely simple and consists in pouring it into ice water, filtering and washing the filter residue until the washings run neutral. In many cases the resulting product is analytically pure; otherwise it can be purified by dissolving in a dilute alkali and reprecipitating with acetic acid.

The following examples illustrate the invention. Unless otherwise stated, parts and percentages are by weight:

Example 1

A mixture of 50 parts of 90% sulphuric acid and 14 parts of 2-phenyl-4:6-diamino-1:3:5-triazine was stirred for 15 hours at 120 to 125° C. The solution was cooled to about 70° C. and then poured into a mixture of 400 parts of water and 100 parts of ice and stirred for about one hour. The precipitated 2-phenyl-4:6-dihydroxy-1:3:5-triazine was filtered off, washed with water to remove the sulphuric acid and dried. The product melted at 289–290° C. (corrected) with decomposition and was substantially pure. Yield: 12.3 parts=86.9% of the theoretical.

$C_9H_7O_2N_3$.—Oxygen: calculated 16.92, found 17.13%. Nitrogen: calculated 22.21, found 22.33%.

Example 2

By hydrolyzing 40 parts of 2-phenyl-4:6-diamino-1:3:5-triazine with 100 parts (=55.6 parts by volume) of 90% sulphuric acid as described in Example 1 and adding the solution at 110° C. with vigorous stirring to 350 parts of ice water (about 1:1) and working up, substantially pure 2-phenyl-4:6-dihydroxy-1:3:5-triazine melting at 286–287° C. (corrected) with decomposition was similarly obtained. It contained 22.33% of nitrogen. Yield: 90.2% of the theoretical.

Example 3

A mixture of 28.2 parts of 2-phenyl-4:6-diamino-1:3:5-triazine and 100 parts of 94% sulphuric acid was stirred for 25 hours at 140 to 145° C., cooled to 110° C. and the solution poured into 350 parts of ice water (about 1:1) and worked up. Yield: 24.8 parts (=87% of the theoretical) of 2-phenyl-4:6-dihydroxy-1:3:5-triazine melting at 286–287% C. (corrected) with decomposition.

Example 4

A mixture of 100 parts of 94% sulphuric acid and 28.2 parts of 2-phenyl-4:6-diamino-1:3:5-triazine was stirred for 25 hours at 130 to 135° C. in a closed vessel. After cooling, the reaction mixture was poured into about 600 parts of water and stirred until it had cooled to room temperature. The precipitated product was then filtered and dissolved in 600 parts of 4.7% sodium hydroxide solution. Addition of 47 parts of glacial acetic acid to this solution caused the 2-phenyl - 4:6 - dihydroxy-1:3:5-triazine to precipitate; it was filtered, washed until neutral and dried. Yield: 24.1 parts=84.5% of the theoretical. Melting point: 289–290° C. (corrected) with decomposition. According to analysis, the reaction product was very pure.

$C_9H_7O_2N_3$.—Oxygen: calculated 16.92, found 16.99%. Nitrogen: calculated 22.21, found 22.17%.

Example 5

140 parts of 2-phenyl-4:6-diamino-1:3:5-triazine were stirred into 500 parts of 90% sulphuric acid. The temperature rose to 90° C. and the solution obtained was stirred for 15 hours at 120 to 125° C., cooled to 95° C., and then stirred into a mixture of 650 parts of ice and 1100 parts of water. The mixture was thoroughly stirred, and the precipitated 2-phenyl-4:6-dihydroxy-1:3:5-triazine was filtered and washed with water. It was then thoroughly stirred in a solution of 84 parts of sodium acetate in 2000 parts of water, again filtered, washed with water and dried.

The product, obtained in a yield of 90% of the theoretical, melted at 286–287° C. (corrected) with decomposition.

A mixture of 169 parts of phosphorus oxychloride, 84 parts of phosphorus pentachloride and 37.8 parts of 2-phenyl-4:6-dihydroxy-1:3:5-triazine (prepared as described in the first paragraph of this example) was stirred for 3 hours under reflux. The resulting solution when fractionated gave a yield of 86.7% of the theoretical of substantially pure 2-phenyl-4:6-dichloro-1:3:5-triazine melting at 122–123° C. (corrected) and boiling at 162–164° C. under 10 mm. Hg pressure.

When extremely pure 2-phenyl-4:6-dihydroxy-1:3:5-triazine was used, the dichlorotriazine was obtained in a yield of 88.4% of the theoretical.

*Example 6*

A mixture of 30 parts of 2-(4'-nitrophenyl)-4:6-diamino-1:3:5-triazine (melting point, corrected: 334° C.) and 300 parts of 80% sulphuric acid was stirred for 20 hours at 118–122° C. The mixture was allowed to cool slightly and then stirred into 1000 parts of ice water. The precipitated 2-(4'-nitrophenyl)-4:6-dihydroxy-1:3:5-triazine was rapidly filtered and purified via its sodium salt. For this purpose the moist product was stirred in 500 parts of water, and the fine suspension made alkaline with about 50 parts by volume of 30% sodium hydroxide solution. The resulting sodium salt was rapidly filtered, dispersed in 500 parts of water and acidified with about 50 parts by volume of glacial acetic acid while being stirred. The batch was suction-filtered and the filter residue washed with water and dried. The yield was 22.1 parts of substantially pure 2-(4'-nitrophenyl)-4:6-dihydroxy-1:3:5-triazine melting at 318° C. (corrected) with decomposition. This compound could not be prepared as disclosed in German specification No. 1,026,456, published Mar. 20, 1958, to Badische Anilin- & Soda-Fabrik Aktiengesellshafen, Germany.

By reaction with phosphorus pentachloride this compound was converted into 2-(4'-nitrophenyl)-4:6-dichloro-1:3:5-triazine which melted at 189° C. (corrected).

*Example 7*

A mixture of 34 parts of 2-(2'-nitrophenyl)-4:6-diamino-1:3:5-triazine (melting at 236° C., corrected) and 120 parts of 80% sulphuric acid was stirred for 15 hours at 105 to 110° C. The reaction mixture was allowed to cool and vigorously stirred into 400 parts of ice water and then worked up in the cold. Yield: 18.1 parts of 2-(2'-nitrophenyl)-4:6-dihydroxy-1:3:5-triazine melting at 267–268° C. (corrected) with decomposition.

On reaction with phosphorus pentachloride the above product gave a good yield of 2-(2'-nitrophenyl)-4:6-dichloro-1:3:5-triazine melting at 119–120° C. (corrected).

*Example 8*

A mixture of 10 parts of 2-(4'-benzoylphenyl)-4:6-diamino-1:3:5-triazine (melting at 280° C., corrected) and 100 parts of 75% sulphuric acid was stirred for 21 hours at 100 to 105° C. and then vigorously stirred into 400 parts of ice water. The precipitated product was suctioned off and washed with water until the washings ran neutral. For purification the moist suction filter cake (about 30 g.) was heated with a solution of 70 parts by volume of dimethylformamide in 50 parts of water and the insoluble impurities filtered off. The filtrate crystallised on cooling and 2-(4'-benzoylphenyl)-4:6-dihydroxy-1:3:5-triazine was obtained in a yield of 81% of the theoretical. The product melted at 294–295° C. (corrected) with decomposition and was converted into 2-(4'-benzoylphenyl)-4:6-dichloro-1:3:5-triazine melting at 153° C. (corrected).

The above compound could not be manufactured by the process described in German Specification No. 1,026,456 published Mar. 20, 1958 to Badische Anilin- and Soda-Fabrik, Aktiengesellschaft, Ludwigshafen, Germany.

*Example 9*

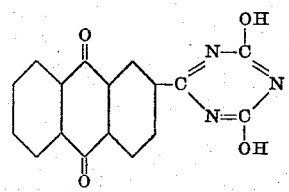

A mixture of 10 parts of 2-(anthraquinonyl-2')-4:6-diamino-1:3:5-triazine (melting above 360° C.) and 150 parts of 90% sulphuric acid was stirred for 16 hours at 130 to 135° C., allowed to cool to 60° C. and then vigorously stirred into 500 parts of ice water. The precipitated 2-(anthraquinonyl-2')-4:6-dihydroxy-1:3:5-triazine was filtered cold, washed with water and dried. Yield: 91% of the theoretical.

After recrystallisation from dimethylformamide+water (5:1) the product melted at 300° C. (corrected) with decomposition. It was converted into 2-(anthraquinonyl-2')-4:6-dichloro-1:3:5-triazine melting at 249° C. (corrected).

The above product could not be manufactured by the process disclosed in German specification No. 1,026,456, published Mar. 20, 1958 to Badische Anilin- and Soda-Fabrik Aktiengesellschaft, Ludwigshafen, Germany.

*Example 10*

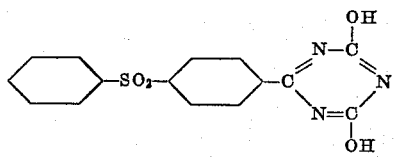

A mixture of 5 parts of 2(4'-benzenesulphenyl)-4:6-diamino-1:3:5-triazine (melting at 300° C., corrected) and 50 parts of 80% sulphuric acid was stirred for 15 hours at 110–115° C., then vigorously stirred into 250 parts of ice water and worked up in the cold. Yield: 96% of the theoretical of 2-(4'-benzenesulphophenyl)-4:6-dihydroxy-1:3:5-triazine which as obtained was very pure and could be converted into an analytically pure form (melting at 330° C., corrected with decomposition) by recrystallisation from aqueous dimethylformamide.

The 2-(4'-benzenesulphophenyl)-4:6-dichloro-1:3:5-triazine obtained from the above product melted at 232° C. (corrected).

*Example 11*

A mixture of 15 parts of 2-(3'-trifluoromethylphenyl)-4:6-diamino-1:3:5-triazine (melting at 211° C., corrected) and 66 parts of 75% sulphuric acid was stirred for 12 hours at 105–110° C. The batch was poured into 300 parts of ice water (1:1), stirred for 1 hour and the resulting 2-(3'-trifluoromethylphenyl)-4:6-dihydroxy-1:3:5-triazine filtered off; after having been washed with water and dried it melted at 305° C. (corrected) with decomposition. Yield: 81% of the theoretical.

The 2-(3'-trifluoromethylphenyl)-4:6-dichloro-1:3:5-triazine obtained from the above product melted at 98° C. (corrected).

Example 12

A mixture of 10 parts of 2-(4'-methoxyphenyl)-4:6-diamino-1:3:5-triazine (melting at 235° C., corrected) and 40 parts of 80% sulphuric acid was stirred for 16 hours at 100–105° C. After cooling, the reaction mixture was vigorously stirred into 150 parts of ice water and worked up in the cold. Yield: 90.2% of the theoretical of 2-(4'-methoxyphenyl)-4:6-dihydroxy-1:3:5-triazine, melting at 306–308° C. (corrected) with decomposition. An analysis showed that this product was very pure.

$C_{10}H_9O_3N_3$.—Oxygen: calculated 21.9, found 22.1%. Nitrogen: calculated 19.17, found 19.33%.

The 2-(4'-methoxyphenyl)-4:6-dichloro-1:3:5-triazine prepared from the above product melted at 138° C. (corrected).

Example 13

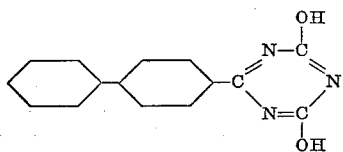

A mixture of 7.5 parts of 2-(diphenyl-4')-4:6-diamino-1:3:5-triazine melting at 277° C. (corrected) and 50 parts of 80% sulphuric acid was stirred for 15 hours at 110–115° C. and then thoroughly stirred in 300 parts of ice water. The precipitated 2-(diphenyl-4')-4:6-dihydroxy-1:3:5-triazine was filtered, washed until the washings ran neutral and purified via the sodium salt. For this purpose the moist filter cake was heated to the boil in about 500 parts of water and dissolved by cautiously adding sodium carbonate solution with vigorous stirring. A small amount of insoluble material was filtered off and the alkaline filtrate allowed to cool. The resulting crystalline sodium salt was rapidly suctioned off, stirred with water and acidified with hydrochloric acid. The batch when filtered, washed with water and dried, gave 2-(diphenyl-4')-4:6-dihydroxy-1:3:5-triazine, melting at 326–330° C. (corrected) with decomposition, in a yield of 72% of the theoretical.

2 - (diphenyl-4')-4:6-dichloro-1:3:5-triazine obtained from this product melted at 161° C. (corrected).

Example 14

A mixture of 15 parts of 2-(2':5'-dichlorophenyl)-4:6-diamino-1:3:5-triazine (melting at 269° C., corrected) and 75 parts of 90% sulphuric acid was stirred for 15 hours at 120–125° C., allowed to cool, and the hydrolysis mixture then vigorously stirred into 300 parts of ice water (1:1), thoroughly stirred for a prolonged period, and the resulting 2-(2':5'-dichlorophenyl)-4:6-dihydroxy-1:3:5-triazine worked up; it melted at 268° C. (corrected) with decomposition. Yield: 75% of the theoretical.

The 2-(2':5'-dichlorophenyl)-4:6-dichloro - 1:3:5 - triazine obtained from the above product melted at 135° C. (corrected).

Example 15

Hydrolysis of 10 parts of 2-(4'-methylphenyl)-4:6-diamino-1:3:5-triazine (melting at 242° C., corrected) with 50 parts of 90% sulphuric acid for 15 hours at 120–125° C. gave 2-(4'-methylphenyl)-4:6-dihydroxy-1:3:5-triazine in a yield of 97% of the theoretical.

$C_{10}H_9O_2N_3$.—Oxygen: calculated 15.75, found 15.92%. Nitrogen: calculated 20.68, found 20.66%.

2-(4'-methylphenyl)-4:6-dichloro - 1:3:5 - triazine obtained therefrom melted at 150° C. (corrected).

Example 16

Hydrolysis of 14 parts of 2-phenyl-4-amino-6-hydroxy-1:3:5-triazine (melting at 343° C., corrected with decomposition) in 50 parts of 90% sulphuric acid for 15 hours at 120 to 125° C. yielded 2-phenyl-4:6-dihydroxy-1:3:5-triazine melting at 289–290° C. (corrected) with decomposition.

The starting material, 2-phenyl-4-amino-6-hydroxy-1:3:5-triazine, could be prepared by the process of German specification No. 543,112 patented Jan. 14, 1932 to I. G. Farbenindustrie A.G., Frankfurt am Main, Germany, by heating benzoic acid (or its chloride or anhydride) with dicyandiamide.

The 2-aryl - 4:6 - diamino-1:3:5-triazines used in Examples 1 to 15 were obtained by known methods from the corresponding arylcyanides, for example in the following manner:

A mixture of 0.184 mol potassium hydroxide, 1 mol benzonitrile, 1.1 to 1.2 mols dicyandiamide and 2.71 mols glycol monomethyl ether was gradually heated to 90–100° C. with stirring until the heat of reaction caused condensation, during which efficient cooling must be provided. When the reaction had subsided, the whole was heated for 4 hours at the boil and then allowed to cool. The 2-aryl-4:6-diamino-1:3:5-triazines generally crystallised out; if not they could be precipitated with water. They were easy to purify by recrystallisation from aqueous dimethylformamide.

In the case of sparingly soluble arylcyanides, such as 2-cyano-anthraquinone, the proportion of glycol monomethyl ether used in the process should be increased but only so much that condensation could still be effected.

What is claimed is:

1. A process for the manufacture of a 2-aryl-4:6-dihydroxy-1:3:5-triazine which comprises hydrolyzing a manufacture selected from the group consisting of a 2-aryl-4:6-diamino-1:3:5-triazine and a 2-aryl-4-amino-6-hydroxy-1:3:5-triazine with sulfuric acid of 70–96% strength.

2. A process as claimed in claim 1, wherein the hydrolysis takes place within the temperature range from 90 to 150° C.

3. A process as claimed in claim 1, wherein for each part of a 2-aryl-4:6-diamino-1:3:5-triazine at least 2 parts by weight of sulphuric acid are used.

4. A process as claimed in claim 1, wherein a 2-phenyl-4:6-diamino-1:3:5-triazine is used as starting material.

5. The compound of the formula

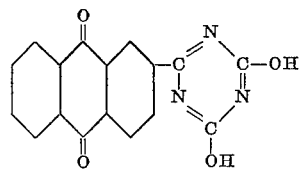

6. The compound of the formula

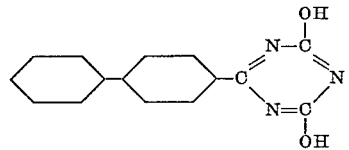

7. The compound of the formula

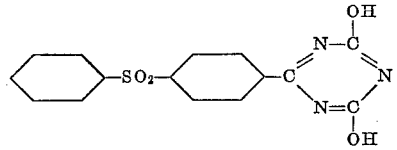

8. The compound of the formula

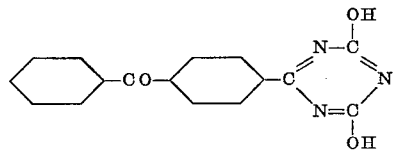

9. The compound of the formula

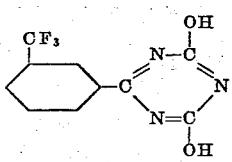

10. The compound of the formula

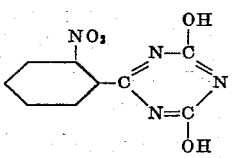

11. The compound of the formula

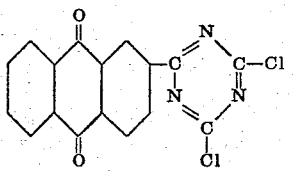

12. The compound of the formula

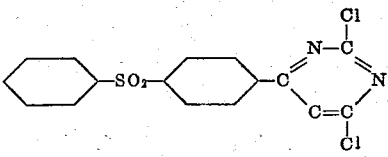

13. The compound of the formula

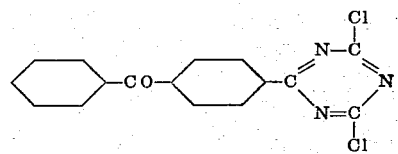

14. The compound of the formula

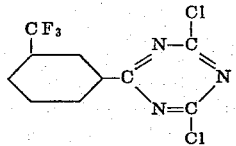

References Cited

UNITED STATES PATENTS

| | | |
|---|---|---|
| 2,232,871 | 2/1941 | Schmidt _____ 260—248 XR |
| 2,832,779 | 4/1958 | Ebel et al. _____ 260—249 |
| 3,157,651 | 11/1964 | Atkinson et al. _____ 260—248 |

FOREIGN PATENTS

| | | |
|---|---|---|
| 784,926 | 10/1957 | Great Britain. |
| 1,026,456 | 3/1958 | Germany. |

OTHER REFERENCES

Noller: "Chemistiry of Organic Compounds," second edition, W. B. Saunders Co., Philadelphia (1957), page 481.

Gilman (ED.): "Organic Synthesis," collective vol. 1, Wiley and Sons, New York (1941), pp. 455-6.

Koopman: Rev. Trav. Chem., vol. 80, pp. 158-72 (1961), also Chem. Abstracts, vol. 55, col. 18755e.

WALTER A. MODANCE, *Primary Examiner.*

J. M. FORD, *Assistant Examiner.*

UNITED STATES PATENT OFFICE
CERTIFICATE OF CORRECTION

Patent No. 3,340,261             September 5, 1967

Eduard Moergeli

It is hereby certified that error appears in the above numbered patent requiring correction and that the said Letters Patent should read as corrected below.

Column 7, lines 33 to 37, the formula should appear as shown below instead of as in the patent:

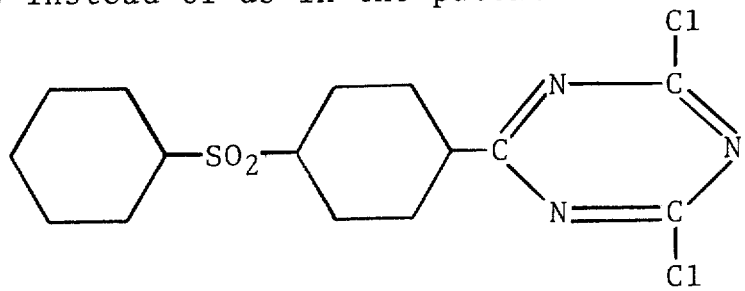

Signed and sealed this 21st day of January 1969.

(SEAL)
Attest:

Edward M. Fletcher, Jr.
Attesting Officer

EDWARD J. BRENNER
Commissioner of Patents